United States Patent
Roopnarine et al.

[11] Patent Number: 5,738,472
[45] Date of Patent: Apr. 14, 1998

[54] MODIFIED LOCKING THREAD FORM FOR FASTENER

[75] Inventors: Roopnarine, New York, N.Y.; John D. Vranish, Crofton, Md.

[73] Assignee: Honeybee Robotics Inc., New York, N.Y.

[21] Appl. No.: 733,345

[22] Filed: Oct. 17, 1996

[51] Int. Cl.$^6$ .................... F16B 35/04; F16B 39/30
[52] U.S. Cl. .................. 411/309; 411/366; 411/411
[58] Field of Search ........................... 411/308, 309, 411/310, 311, 324, 411, 366

[56] References Cited

U.S. PATENT DOCUMENTS

| | | | |
|---|---|---|---|
| 271,852 | 2/1883 | Hull | 411/311 |
| 1,016,897 | 2/1912 | Ryan | 411/308 |
| 1,451,484 | 4/1923 | Woodward | 411/311 |
| 3,133,578 | 5/1964 | Moskovitz | 411/309 |
| 3,426,820 | 2/1969 | Phipard, Jr. | 411/310 |

Primary Examiner—Neill R. Wilson
Attorney, Agent, or Firm—Leighton K. Chong

[57] ABSTRACT

A threaded fastener has a standard part with a standard thread form characterized by thread walls with a standard included angle, and a modified part complementary to the standard part having a modified thread form characterized by thread walls which are symmetrically inclined with a modified included angle that is different from the standard included angle of the standard part's thread walls, such that the threads of one part make pre-loaded edge contact with the thread walls of the other part. The thread form of the modified part can have an included angle that is greater, less, or compound as compared to the included angle of the standard part. The standard part may be a bolt and the modified part a nut, or vice versa. The modified thread form holds securely even under large vibrational forces, it permits bi-directional use of standard mating threads, is impervious to the build up of tolerances and can be manufactured with a wider range of tolerances without loss of functionality, and distributes loading stresses (per thread) in a manner that decreases the possibility of single thread failure.

18 Claims, 6 Drawing Sheets

MODIFIED LOCKING THREAD FORM FOR FASTENER

The invention described herein as made with U.S. Government support under contract NAS5-32,904 awarded by NASA. The U.S. Government has certain rights in this invention.

This patent application claims the priority of U.S. Provisional application Ser. No. 60/005,574 filed on Oct. 18, 1995.

FIELD OF THE INVENTION

This invention generally relates to a fastener for bolted joints or fixtures, and particularly to a modified locking thread form that can increase resistance to loosening under vibrational loads.

BACKGROUND ART

The prior art consists of unidirectional thread forms, conventional torque fasteners, and other secondary fastening methods, e.g., epoxy and lockwashers for preventing standard bolts and nuts from vibrating loose. Such methods usually employ the deformation of a secondary element to prevent the slight movements that cause fasteners to work loose.

Elastic deformation of fasteners usually results in a one-time use for the elements and may further inhibit servicing in hostile environments such as in space. Unidirectional thread forms limit the designs that can be used in that they dictate the manner in which a particular joint must be designed in order to make effective use of the locking feature. Secondary locking elements, such as lockwashers, score the surfaces which are clamped or fastened together, and epoxying fasteners to prevent relative motion can also result in unserviceable joints. Excessive preloading is necessary in most instances to input enough energy into the joint so as to increase resistance to vibrational loads.

SUMMARY OF THE INVENTION

In accordance with the present invention, a modified locking thread form is provided that has the advantage of being axially reversible, can be an external or internal thread, is compatible and designed to be used with a standard mating thread form, can be manufactured cheaply and effectively as nuts, bolts or taps, and can be reused many times without any loss in its functionality. Further, the invention distributes loads in an effective manner in which there is a significant improvement in the force/thread ratio. The invention is expected to be used wherever vibration resistance is critical or needed to prevent loss of preload and the loosening of joints.

In accordance with the present invention, a threaded fastener has a first fastener part having a uniformly repeating pattern of threads, wherein said threads have a standard thread form characterized by thread walls which are symmetrically inclined with a predetermined standard included angle, and a second fastener part complementary to the first fastener part having a uniformly repeating pattern of corresponding threads, wherein said corresponding threads have a modified thread form characterized by thread walls which are symmetrically inclined with a modified included angle that is different from the standard included angle of the first fastener part's thread walls such that the threads of one of the complementary parts make pre-loaded edge contact with the thread walls of the other of the complementary parts.

In different versions, the modified thread form has thread walls with an included angle that is greater, less, or compound as compared to the included angle of the thread walls of the standard fastener part. The standard part may be a bolt and the modified part a nut, or vice versa.

The modified thread form allows edge contact to be made between the threads of the complementary parts such that they deform bitingly into each other and hold securely even under large vibrational forces. The modification of a standard thread form permits the use of standard mating threads with the invention and simultaneously provide high resistance to vibration loosening. Symmetrical modification of the standard thread form permits the bidirectional use of the thread form. The modified thread form is impervious to the build up of tolerances and can be manufactured with a wider range of tolerances without loss of functionality. It also distributes loading stresses (per thread) in a manner that decreases the possibility of single thread failure even when the threaded material is soft.

Other objects, features and advantages of the present invention are described in detail below in conjunction with the drawings, as follows:

DETAILED DESCRIPTION OF THE INVENTION

Figure 1B:
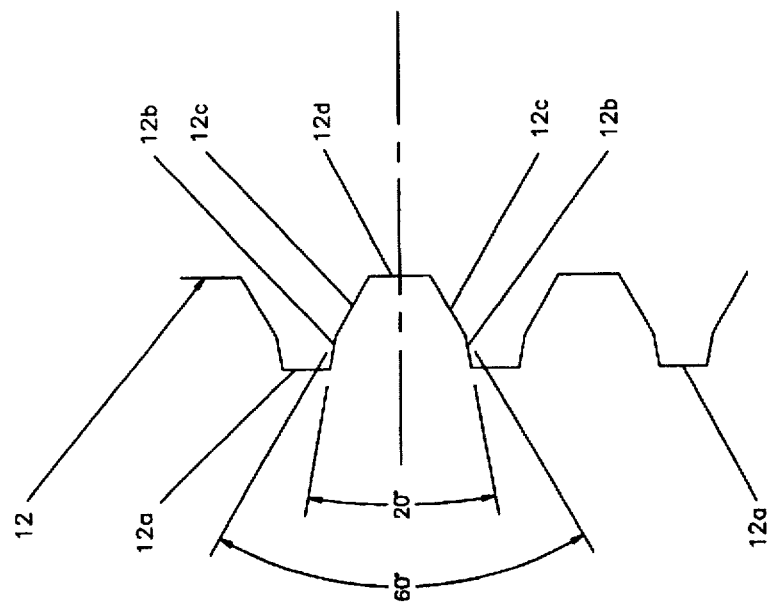
FIG. 1B shows a profile view of the thread form.
Figure 1A:
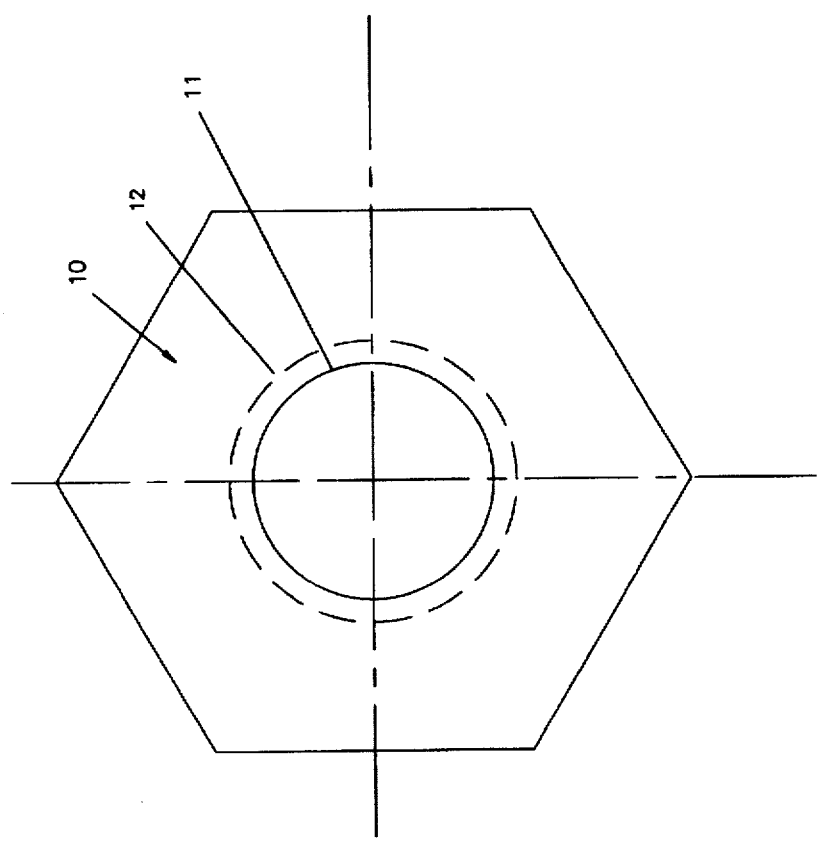
FIG. 1A shows a nut having a first version of the modified thread form in accordance with the invention.

A first version of the present invention is shown in the accompanying FIGS. 1A and 1B representing a modification of the standard thread form. In FIG. 1A, a nut fastener 10 for use with a corresponding threaded bolt has a central aperture 11 and an internal threading 12 through the thickness of the nut. As shown in FIG. 1B, the threading 12 consists of a uniformly spaced pattern of thread grooves each having a modified cross-sectional shape which accomplishes the purposes of the invention. The thread cross-section has a flat top land 12a which makes contact in the complementary groove of the corresponding bolt, a slightly inclined first wall 12b, a more steeply inclined second wall 12c, and a flat bottom land 12d. As an example, the thread grooves can have an outside radius (to the bottom land) of 0.250 inch from the centerline of the nut aperture, an inside radius of 0.226 inch, for a depth of 0.024 inch. The slightly inclined first wall 12b can extend half the depth, e.g., 0.12 inch, and be inclined at an angle of about 10° to the plane direction of the nut. The more steeply inclined second wall 12b can extend the other half of the depth, e.g., 0.12 inch, and be inclined at an angle of about 30° to the plane direction. The combined first wall thread profile is 20°, and the combined second wall thread profile is 60°. The total width of the groove between the edges of consecutive top lands is 0.032 inch.

Standard fasteners lose their preload because of the existence of accumulated tolerances (that is, clearance) between the threads of a nut and a bolt during manufacturing. This phenomenon results in the formation of air gaps between the mating threads when a joint is bolted together. Under cyclic loading, the cumulative effect of these air gaps is to allow microscopic motion between the internal and external threads such that the bolt and nut eventually work loose along the axis. Once the preloading force is lost the joint failure can be catastrophic. This invention eliminates the effect of loose tolerance fits in a joint by guaranteeing a close fit after the system (i.e. joint) is preloaded.

Figure 2:
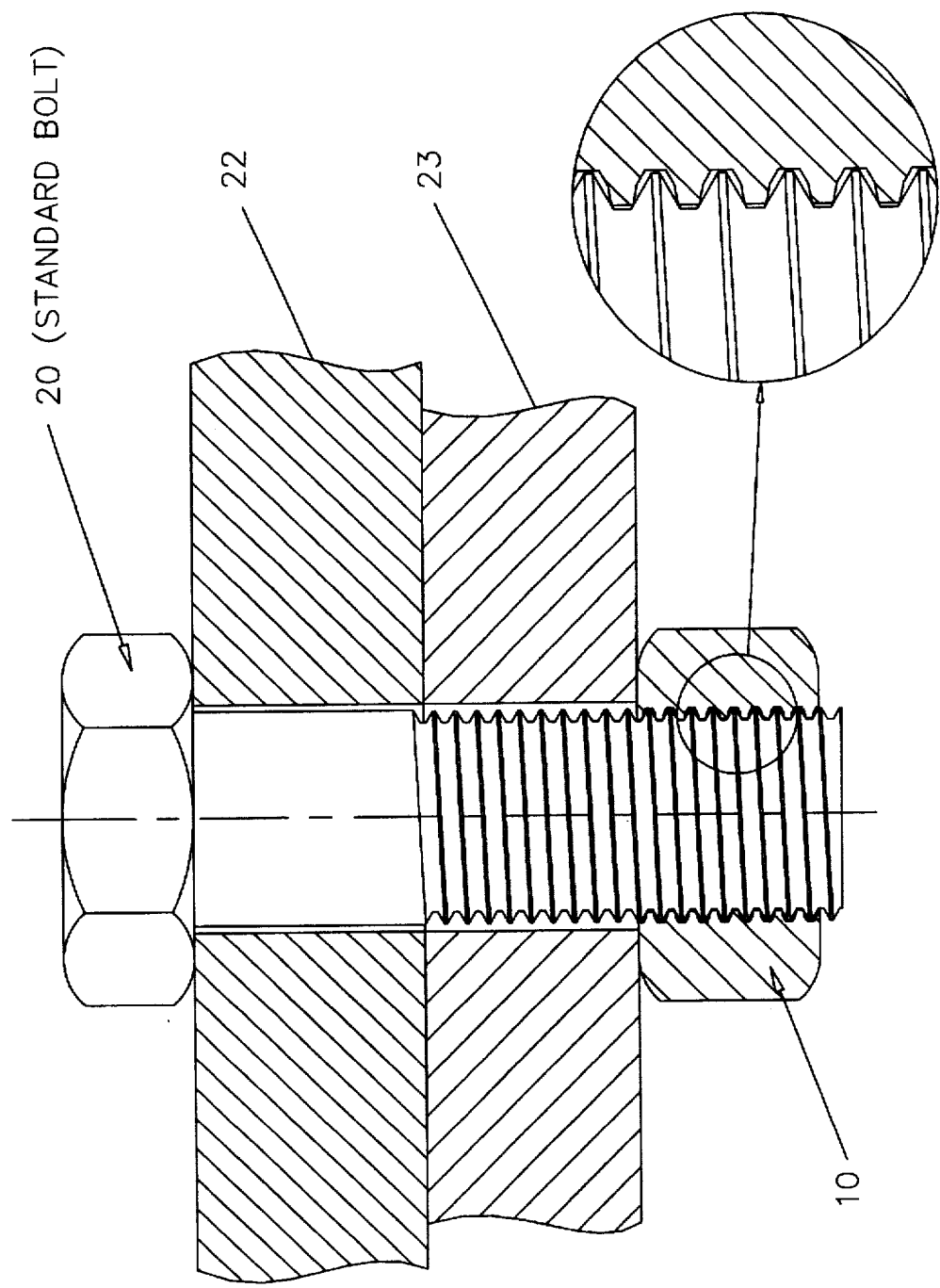
FIG. 2 is a cross-sectional view of the first version applied to a modified internal thread form for a nut.

FIG. 2 shows the effect of preloading an internally threaded system represented by the version of FIG. 1 (compound angle system). In FIG. 2, a standard bolt 20 is secured through two bodies 22 and 23 by the nut 10 having the modified internal thread form 12. The internal thread form has the second thread profile of 60° maintained at the thread root to provide clearance for free-running a bolt, and the first thread profile inclined at 20° (included angle) at the crest of the thread. When the joint is preloaded, the approximate point of contact between the threads is on the flank near the root of the external thread (standard form) and the crest of the 10° flank of the internal thread, as opposed to in the conventional thread form the 30° flank contacting another 30° flank.

The modified thread form allows edge contact to be made between the threads of the complementary parts such that they deform bitingly into each other and hold securely even under large vibrational forces. The modified thread form is impervious to the build up of tolerances (that results in the existence of clearance between standard mating threads) and can, therefore, be manufactured with a wider range of tolerances without loss of functionality. It also distributes loading stresses (per thread) in a manner that decreases the possibility of single thread failure even when the threaded material is soft (e.g. aluminum).

The modification of a standard thread form permits the bidirectional use of standard mating threads with the invention and simultaneously provide high resistance to vibration loosening. The bidirectionality of the thread form allows holes in a component to be tapped from either direction (as is the case with standard threads) thereby providing flexibility in design.

Figure 3:
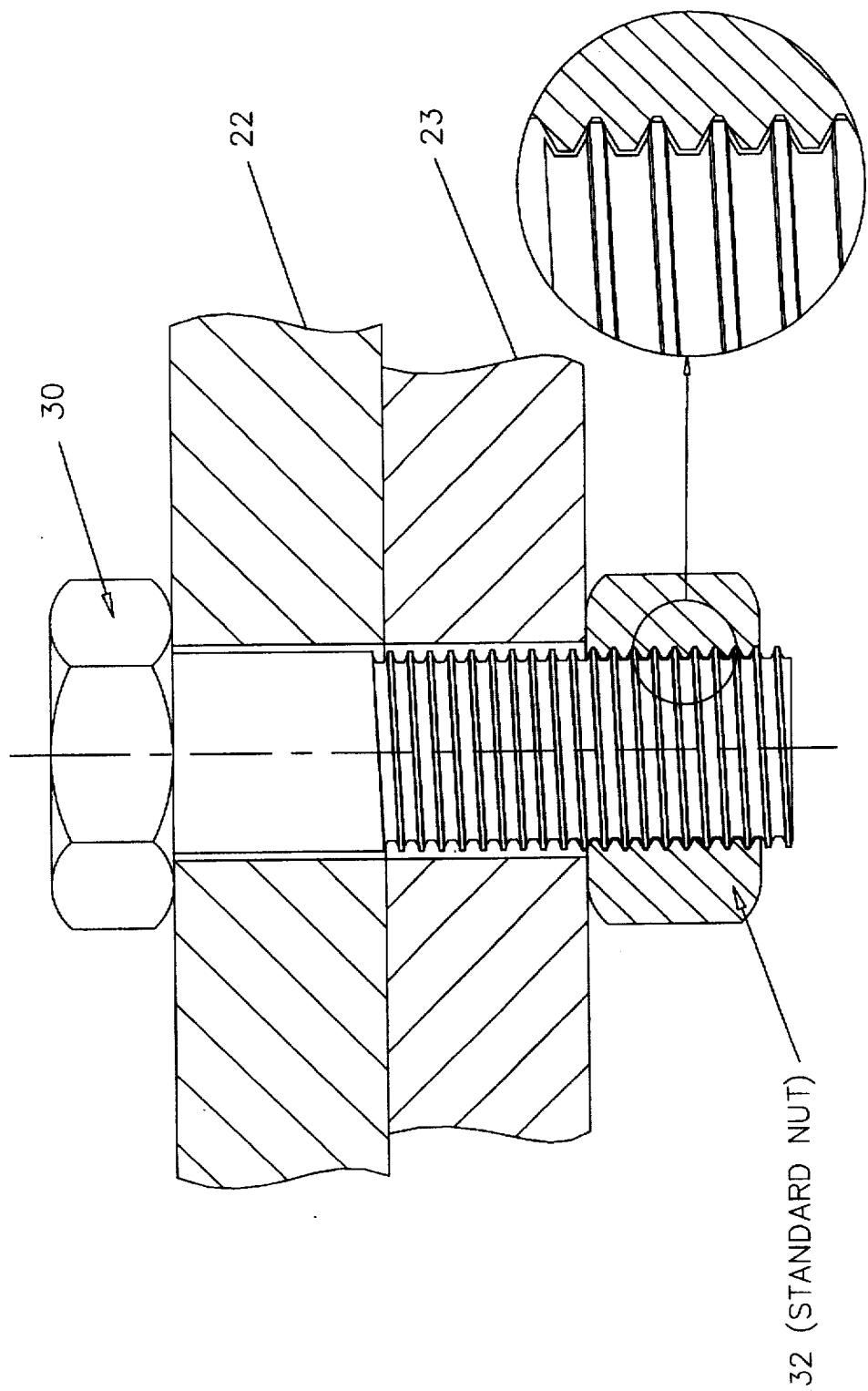
FIG. 3 is a cross-sectional view of the first version applied to a modified external thread form for a bolt.

In FIG. 3, the modified thread form of the first version is instead provided on the external threads of the bolt 30 while a standard nut 32 is used. When the modified thread form of the bolt 30 is preloaded against a standard internal thread form of the nut 32, the crest of the modified thread (at the included angle of 20°) comes into contact with the standard thread of the nut at approximately its root. The same effect of a securely locking is obtained as in the modified internal thread form in FIG. 2.

Figure 4A:
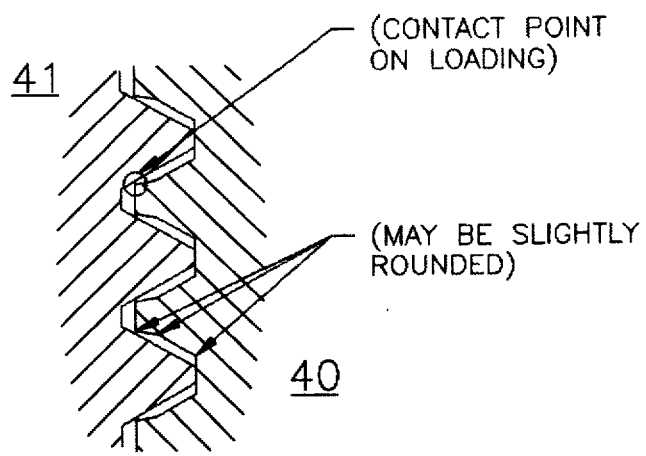
FIGS. 4A and 4B show a comparison of cross-sectional views of the first version as compared to a second version applied to a modified internal thread form for a nut for a ½"—20 screw system.
Figure 4B:
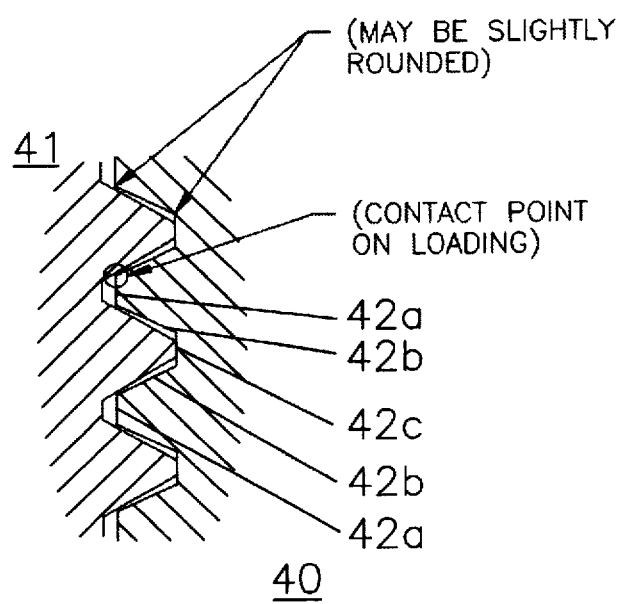

As compared to the first version illustrated in side-by-side fashion in FIG. 4a, a second verson of the invention having a single angle of thread wall is shown in FIG. 4b for a Class 3 fit with a standard ½"—20 bolt. In this version, the width of the root or bottom 42c of the internal thread of the nut 40 is slightly larger than the top of standard external thread form of the bolt 41, and the total included angle between the thread flanks 42b is made smaller, e.g., 50°, as compared to the flanks of the standard external thread form having an angle of 60°. Thus, the crests or top lands 42a of the modified internal thread form 40 make contact with the flanks near the root of the standard external thread form 41. The intersection points of the modified thread form may be made slightly rounded without reducing the intended effect.

Figure 5A:
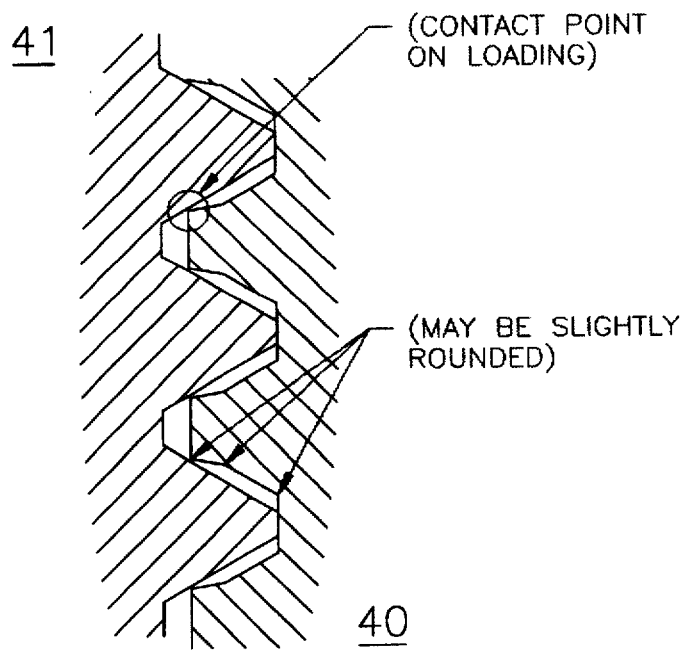
FIGS. 5A and 5B show a comparison of cross-sectional views of the first version as compared to a second version applied to a modified internal thread form for a nut for a #10—32 screw system.
Figure 5B:
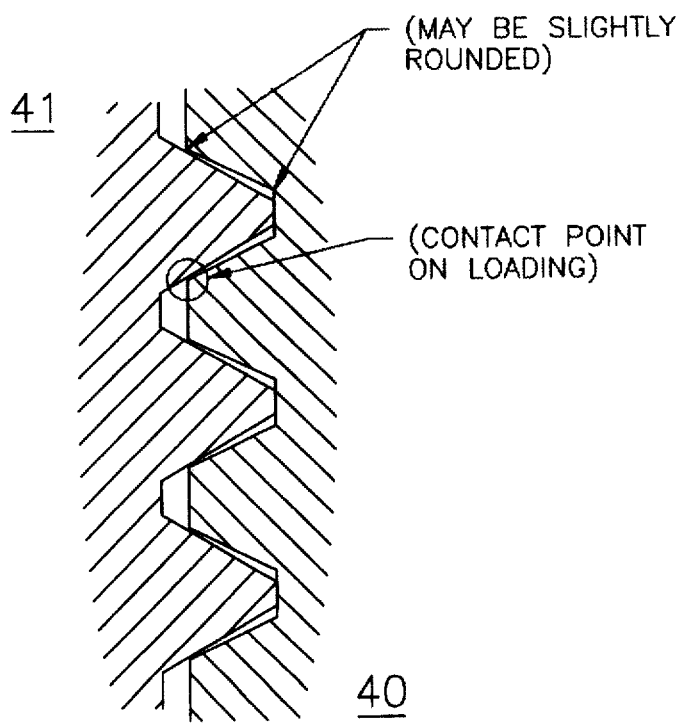

FIGS. 5A and 5B show a similar comparison of modified thread form profiles for a Class 3 fit with a #10—32 bolt.

Standard practice in the fastener manufacturing industry recognizes three classes of fit, namely, Class 1, Class 2, and Class 3, which specify various tolerances (and consequently, clearances) between male and female thread forms. In this case, the disclosed example is manufactured to mate with a standard male or female thread form with a tolerance specified by a Class 3 fit. The invention is not limited to a Class 3 fit and in fact can perform with the same resistance to loosening with other classes.

Figure 6B:
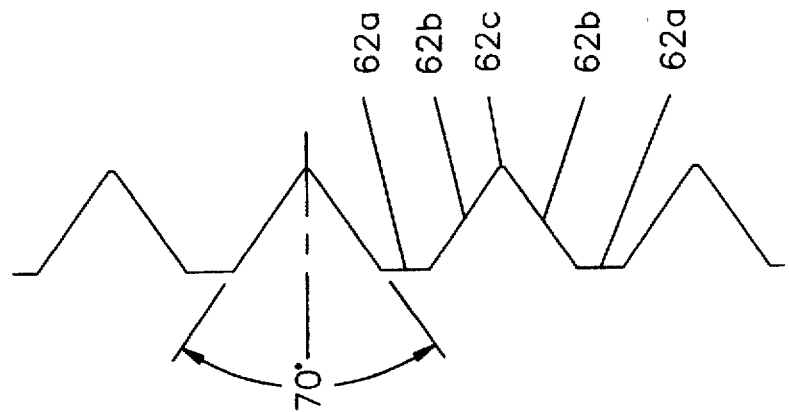
FIG. 6B shows a profile view of the thread form.
Figure 6A:
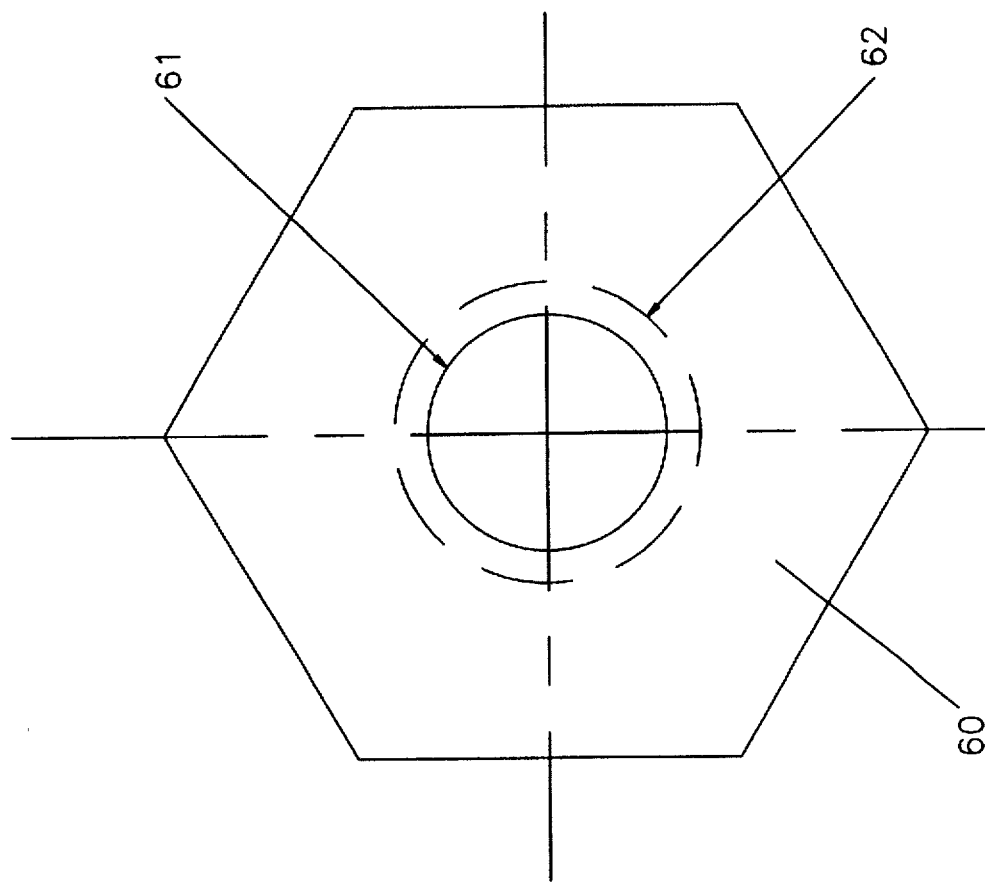
FIG. 6A shows a nut having a third version of the modified thread form in accordance with the invention.

A third version (reverse single angle), which is the reverse of the second version described above, provides the same advantages of the previously described versions. As shown in FIG. 6, the nut 60 has a central aperture 61 with an internal thread form 62 having an included angle of 70° for its flanks 62b which is larger than the standard 60° angle of the standard external thread form. The standard external thread has a smaller width than the modified internal thread at its crest 62a but is larger at the base (the internal thread root 62c is smaller). Preloading of this third version provides area contact between the crest of the standard screw thread and the flank near the root of the modified nut thread thereby removing clearance and providing effective locking.

The root width and included angle are selected such that there is enough clearance for free running a bolt into the nut. The thread profiles that result from these modifications provide significantly better load distribution since the loading contact points change to contact areas under elastic deformation of the threads.

The tolerances needed to manufacture modified screw thread systems of the three versions are selected such that, when used with a standard bolt or screw (Class 3A), each will provide superior resistance to vibration loosening. Furthermore, each version will provide vibration resistance with Class 1 and 2 fits and are not dependent on a Class 3 fit for this effect. The preloading process, in all cases, effectively removes the loose fit between the mating threads and prevents relative motion between them. A high resistance to loosening under vibration therefore result regardless of Class fits.

As described above, the modified thread form has a tip angle of 20° (included) in the first version (compound angle system). In the second version (single angle), the included angle is less than the standard 60°. In the third version (reverse single angle), the included angle is greater than 60°. All of these internal thread modifications are completely reversible in that they can be used in the same way as external thread modifications. Again, the modification of contact areas will occur near the crest of the thread for the first version, and at the thread root and the included angle in the second and third versions. It is also possible that any included angle (less than the standard 60° for the second version and greater than 60° for the third version) can be used to provide the same effect in both versions. An optimal angle can be chosen which will be dependent on ease of manufacturability, best resistance to vibrational loads and distribution of loads (force/thread).

The invention improves upon the prior art by providing ease of manufacturability, a symmetrical profile which ensures its bidirectional feature, reversibility (i.e. internal or external forms are possible), high reusability without loss of functionality and high resistance to vibrational loads as indicated by the thread forms' (each version) ability to pass the MIL-STD-1312A, Method 7 test in initial testing. The forms of the threads are such that they are impervious to the build up of tolerances (that results in the existence of clearance between standard mating threads) and can, therefore, be manufactured with a wider range of tolerances without loss of functionality. The bidirectionality of the thread forms allow holes in a component to be tapped from either direction (as is the case with standard threads) thereby providing flexibility in design. Finally, the invention distributes loading stresses (per thread) in a manner that decreases the possibility of single thread failure even when the threaded material is soft (e.g. aluminum).

Although the invention has been described with reference to certain preferred embodiments, it will be appreciated that many other variations and modifications thereof may be devised in accordance with the principles disclosed herein. The invention, including the described embodiments and all variations and modifications thereof within the scope and spirit of the invention, is defined in the following claims.

We claim:

1. A threaded fastener comprising:
    a first fastener part having a uniformly repeating pattern of threads, wherein said threads have a standard thread form characterized by thread walls which are symmetrically inclined with a predetermined standard included angle and by a cross-sectional profile having a first thread crest portion and a first thread root portion; and
    a second fastener part complementary to the first fastener part having a uniformly repeating pattern of corresponding threads, wherein said corresponding threads have a modified thread form characterized by thread walls which are symmetrically inclined with a modified single-included angle that is different from the standard included angle of the first fastener part's thread walls and by a cross-sectional profile having a second thread crest portion and a second thread root portion;
    wherein said modified single-inclined angle and crest and root profile of the thread walls of said second fastener part are formed relative to those of said first fastener part such that the crest portions of one fastener part have a clearance with the root portions of the other fastener part prior to pre-loading, and the crest portions of the one fastener part then elastically deform into wedged contact with the root portions of the other fastener part upon preloading of the complementary fastener parts.

2. A threaded fastener according to claim 1, wherein the second fastener part has thread walls with a modified included angle greater than the standard included angle of the first fastener part.

3. A threaded fastener according to claim 1, wherein the second fastener part has thread walls with a modified included angle less than the standard included angle of the first fastener part.

4. A threaded fastener according to claim 1, wherein the first fastener part has thread walls with a standard included angle of approximately 60°, and the second fastener part has thread walls with a modified included angle greater than 60°.

5. A threaded fastener according to claim 1, wherein the first fastener part has thread walls with a standard included angle of approximately 60°, and the second fastener part has thread walls with a modified included angle less than 60°.

6. A threaded fastener according to claim 1, wherein the first fastener part is a standard bolt and the second fastener part is a nut having modified internal threads.

7. A threaded fastener according to claim 1, wherein the first fastener part is a standard nut and the second fastener part is a bolt having modified external threads.

8. A threaded fastener according to claim 1 wherein the first fastener part is a standard bolt for a Class 3 fit for a ½"—20 screw system, and the second fastener part is a nut having modified internal threads.

9. A threaded fastener according to claim 1, wherein the first fastener part is a standard bolt for a Class 3 fit for a #10—32 screw system, and the second fastener part is a nut having modified internal threads.

10. A modified fastener part, for use with a complementary standard fastener part having a uniformly repeating pattern of threads of a standard thread form characterized by thread walls which are symmetrically inclined with a predetermined standard included angle and by a cross-sectional profile having a standard thread crest portion and a standard thread root portion, said modified fastener part having a uniformly repeating pattern of corresponding threads, wherein said corresponding threads have a modified thread form characterized by thread walls which are symmetrically inclined with a modified single-included angle that is different from the standard included angle of the standard fastener part's thread walls and by a cross-sectional profile having a second thread crest portion and a second thread root portion;
    wherein said modified single-inclined angle and crest and root profile of the thread walls of said modified fastener part are formed relative to those of the standard fastener part such that the crest portions of one fastener part have a clearance with the root portions of the other fastener part prior to pre-loading, and the crest portions of the one fastener part elastically deform into wedged contact with the root portions of the other fastener part upon preloading of the complementary parts.

11. A modified fastener part according to claim 10, having thread walls with a modified included angle greater than the standard included angle of the standard part.

12. A modified fastener part according to claim 10, having thread walls with a modified included angle less than the standard included angle of the standard part.

13. A modified fastener part according to claim 10, wherein the standard part has thread walls with a standard included angle of approximately 60°, and the modified fastener part has thread walls with a modified included angle greater than 60°.

14. A modified fastener part according to claim 10, wherein the standard part has thread walls with a standard included angle of approximately 60°, and the modified fastener part has thread walls with a modified included angle less than 60°.

15. A modified fastener part according to claim 10, wherein the standard part is a bolt and the modified part is a nut having modified internal threads.

16. A modified fastener part according to claim 10, wherein the standard part is a nut and the modified part is a bolt having modified external threads.

17. A modified fastener part according to claim 10, wherein the standard part is a bolt for a Class 3 fit for a ½"—20 screw system, and the modified fastener part is a nut having modified internal threads.

18. A modified fastener part according to claim 10, wherein the standard part is a bolt for a Class 3 fit for a #10—32 screw system, and the modified fastener part is a nut having modified internal threads.

* * * * *